US011628473B1

United States Patent
Hansen et al.

(10) Patent No.: US 11,628,473 B1
(45) Date of Patent: Apr. 18, 2023

(54) COMBINATION TABLE, SIFTER AND COLLECTION TRAY

(71) Applicant: SC Shredder IPP, LLC, Campbell, CA (US)

(72) Inventors: Matt Hansen, Watsonville, CA (US); Mark Edwards, Campbell, CA (US)

(73) Assignee: SC Shredder IP, LLC, Campbell, CA (US)

( * ) Notice: Subject to any disclaimer, the term of this patent is extended or adjusted under 35 U.S.C. 154(b) by 0 days.

(21) Appl. No.: 17/665,496

(22) Filed: Feb. 5, 2022

(51) Int. Cl.
*B07B 1/02* (2006.01)
*B07B 1/46* (2006.01)

(52) U.S. Cl.
CPC .................. *B07B 1/02* (2013.01); *B07B 1/46* (2013.01)

(58) Field of Classification Search
CPC .... B07B 1/02; B07B 1/04; B07B 1/46; B07B 1/526
USPC .......................................................... 209/233
See application file for complete search history.

(56) References Cited

U.S. PATENT DOCUMENTS

| 2,674,375 A * | 4/1954 | Clay ........................ | B07B 1/02 209/357 |
| D272,973 S * | 3/1984 | De Coster ...................... | D7/667 |
| 5,215,196 A * | 6/1993 | Valls ......................... | B07B 1/46 426/115 |
| 8,931,643 B2 * | 1/2015 | Yu ........................... | A47J 43/22 209/374 |
| 10,758,940 B1 * | 9/2020 | Young ........................ | B07B 1/02 |
| 2014/0299049 A1 * | 10/2014 | Constantino, Jr. ....... | A47J 43/22 118/19 |
| 2016/0108555 A1 * | 4/2016 | Rosado ..................... | D01B 1/02 209/409 |
| 2019/0255570 A1 * | 8/2019 | Koerner ..................... | B07B 1/02 |
| 2020/0061672 A1 * | 2/2020 | Vella ......................... | B07B 1/02 |
| 2020/0147645 A1 * | 5/2020 | Goosen ..................... | B07B 1/06 |
| 2021/0153691 A1 * | 5/2021 | Lemasters ................ | A47J 42/30 |

FOREIGN PATENT DOCUMENTS

| CN | 106865026 A | * | 6/2017 | |
| DE | 202018103201 U1 | * | 8/2018 | |
| GB | 2207370 A | * | 2/1989 | ............... B07B 1/02 |
| WO | WO-2020216351 A1 | * | 10/2020 | ............... B07B 1/04 |

OTHER PUBLICATIONS

Greensadi Store (Year: 2021).*
Happy Hydro (Year: 2018).*
Kruve Store (Year: 2020).*
Lawnful (Year: 2021).*
Mogobe Store (Year: 2021).*
OGGI (Year: 2017).*

(Continued)

*Primary Examiner* — Gene O Crawford
*Assistant Examiner* — Muhammad Awais
(74) *Attorney, Agent, or Firm* — The Kline Law Firm; Keith Kline

(57) ABSTRACT

A combination table, sifter, and collection tray for herbs is described herein. The device is generally a food and plant processing device, and more particularly is a combination table, sifter, and collection tray. The table, sifter, and tray are nested into one another to form a unitary device for easy transport.

6 Claims, 5 Drawing Sheets

(56) References Cited

OTHER PUBLICATIONS

Verified Exchange (Year: 2019).*
Vivosun (Year: 2021).*
Birdtown Trader (Year: 2021).*
Chihee (Year: 2019).*
OXO Store (Year: 2021).*
Tancano Store (Year: 2018).*

* cited by examiner

COMBINATION TABLE, SIFTER AND COLLECTION TRAY

CROSS REFERENCE TO RELATED APPLICATIONS

N/A

FIELD OF THE DISCLOSURE

The present disclosure relates generally to food and plant processing devices, and more particularly is a combination table, sifter, and collection tray for herbs. The table, sifter, and tray are nested into one another to form a unitary device.

SUMMARY

In various embodiments of the present disclosure, the combination table, sifter, and collection tray includes an upper element surface with a flat surface that serves as a table, a sifter plate, and a collection tray. Each of the components is nested within one or more of the other components for easy storage and transport.

To secure the device in a unitary configuration, the table includes a pair of side flaps, each of the side flaps including at least one projection that mates with a lip on the collection tray to secure the table to the collection tray.

The sifter includes a plurality of pass-through holes, the pass-through holes allowing ground or chopped plant material to pass from a material receiving space formed in the sifter into a collection area in the collection tray.

A hand-held chopper/scraper can be included with the device.

BRIEF DESCRIPTION OF THE DRAWINGS

The accompanying drawings, wherein like reference numerals refer to identical or functionally similar elements throughout the separate views, together with the detailed description below, illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is directed to devices used to any material the user wishes to grind. In particular, the devices are well suited to processing plant material. The subject device is a combination table, sifter, and collection tray 10, as shown in FIG. 1.

Figure 1:
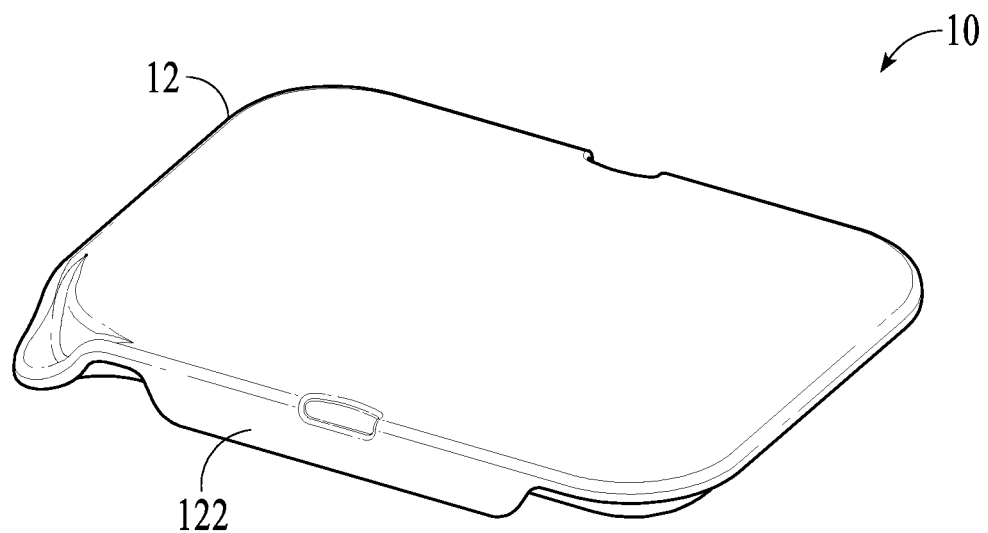
FIG. 1 is a perspective view of a combination table, sifter, and collection tray.
Figure 2:
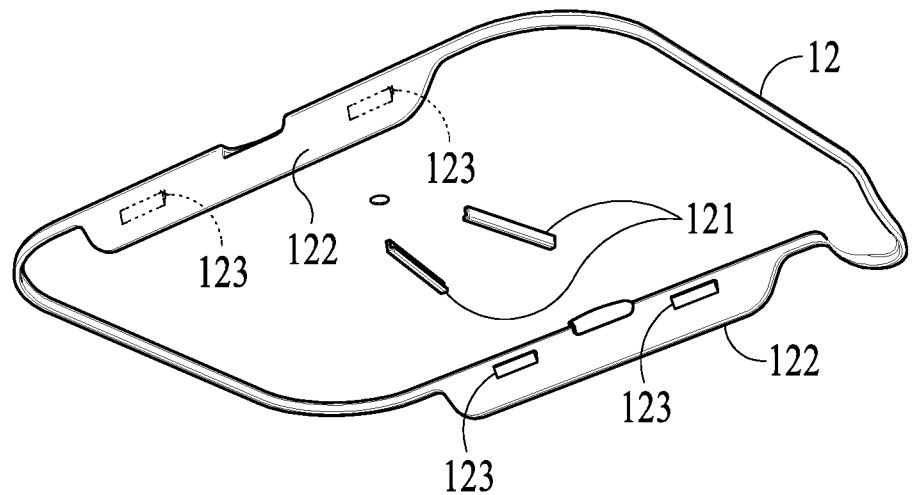
FIG. 2 is an underside view of the table.

Referring first to FIGS. 1 and 2, the combination device 10 includes a table 12, a sifter 14, and a collection tray 16. The table 12 element has a flat top surface formed as an unobstructed planar surface, thereby maximizing the usable work area. The table 12 is therefore suitable to be used as a work station to process whatever material is desired. Any shape of table will suffice, so long as a flat unbroken planar top surface is provided.

Figure 8:
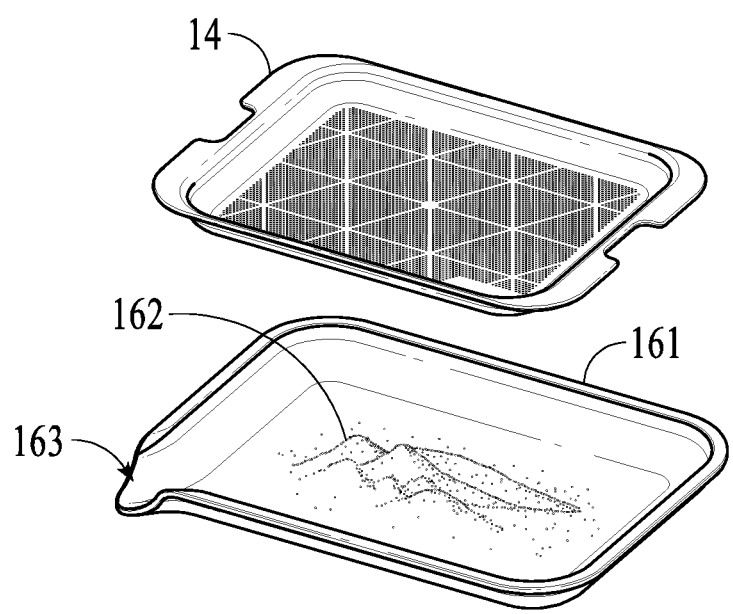
FIG. 8 shows the sifter separated from the collection tray to show the fines (trichomes) collected in the collection area of the collection tray.

The table 12 may also include a chopper clip 121, (shown in FIG. 2 of the drawings as optionally positioned on an underside of the table 12), to secure a scraper/chopper 18 tool (see FIG. 3) to the table 12. The table 12 may include a pair of side flaps 122 that secure the table 12 element to the collection tray 16. While those skilled in the art could design numerous mechanisms by which to secure the table 12 to the collection tray 16, in various preferred embodiments, the securing mechanism is simply one or more projections 123 that create a friction fit with a peripheral lip 161 (see FIG. 8) of the collection tray 16.

Figure 3:
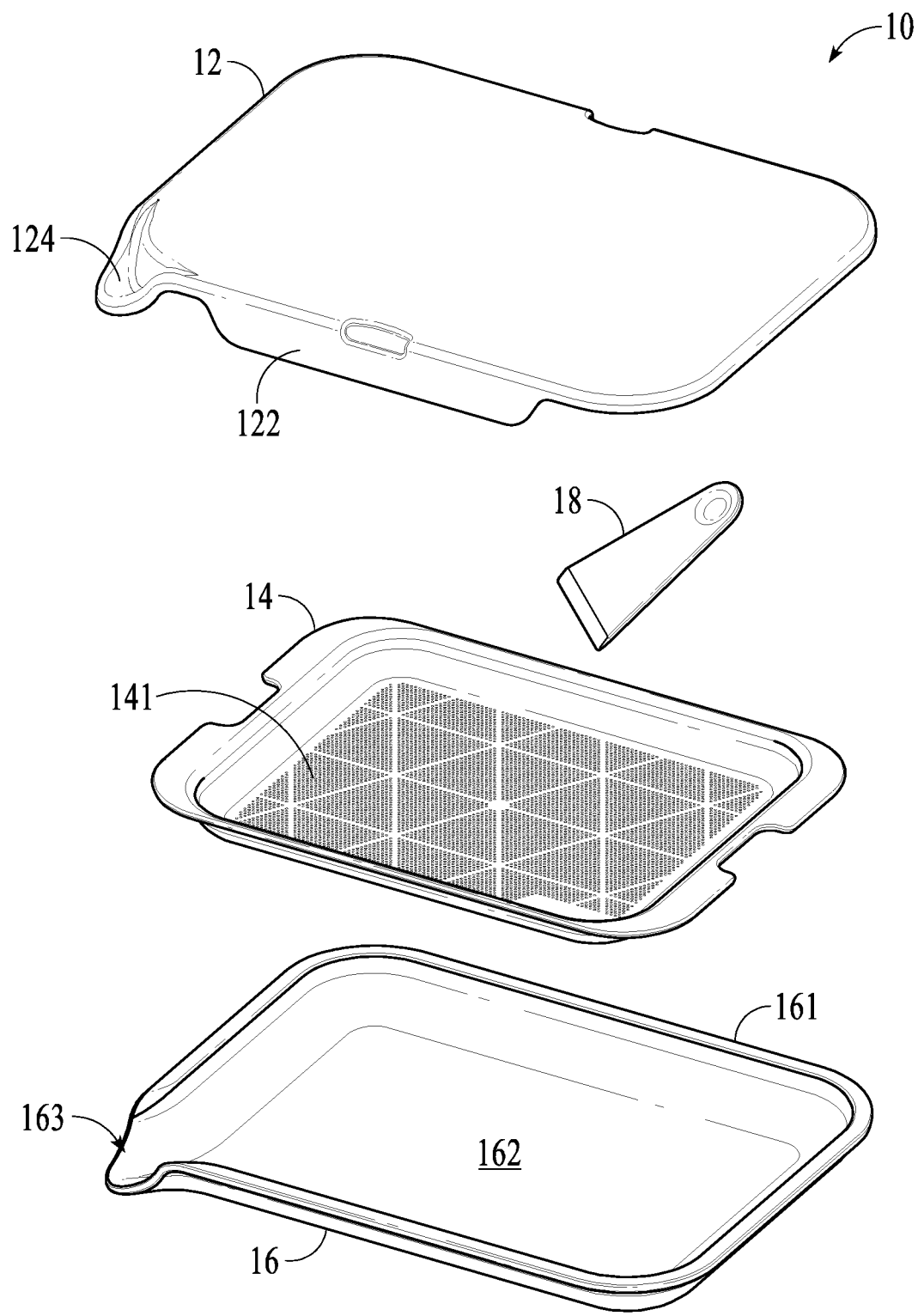
FIG. 3 is an exploded perspective view of the device showing an included chopper/scraper tool.
Figure 4:
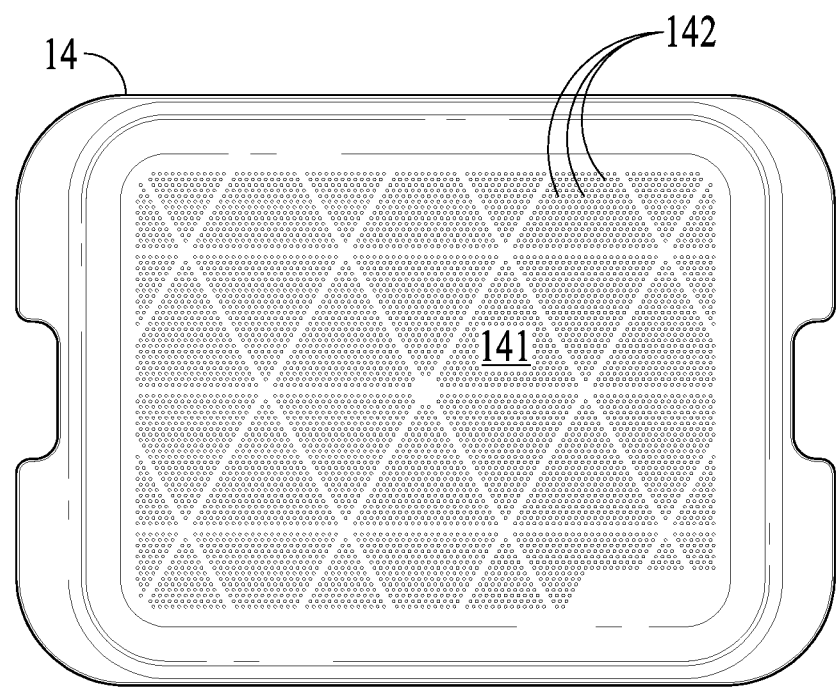
FIG. 4 is a top view of the sifter.

As shown in FIGS. 3 and 4, the sifter 14 has a feed-in area 141 to accept the working material. The feed-in area 141 has a plurality of pass-through holes 142 therein. The pass-through holes 142 enable a user to separate larger pieces of material from smaller pieces of whatever material is being worked on. The user may sift material either by manually moving the sifter 14, or by forcing material through the through holes 142 with the scraper/chopper tool 18.

In some embodiments of the device 10, the sifter 14 is made at least in part from hemp. The sifter 14, as well as the table 12 and the collection tray 16, may be up to 99% hemp, with the remaining component being polypropylene. A more typical composition for the components is 70-80% hemp, and 20-30% polypropylene.

The collection tray 16, as illustrated in FIG. 3, includes the lip 161, a collection area 162 to collect processed product, and a pour spout 163 that enables the user to easily pour product out of the collection tray 16. The table 12 may include a sealing projection 124 that mates with and covers the pour spout 163 to prevent product from spilling out of the pour spout 163. The collection tray 16 is generally positioned beneath and spaced apart from the sifter 14 to collect the fines of whatever substance is being sifted. As shown in FIG. 3, the collection tray 16 is deeper than the sifter 14 to provide the required collection area. It should also be noted that in many cases, the preferred product of a ground plant material is the much desired trichomes of the plant, the fines yielded by grinding and sifting the plant.

Figure 5:
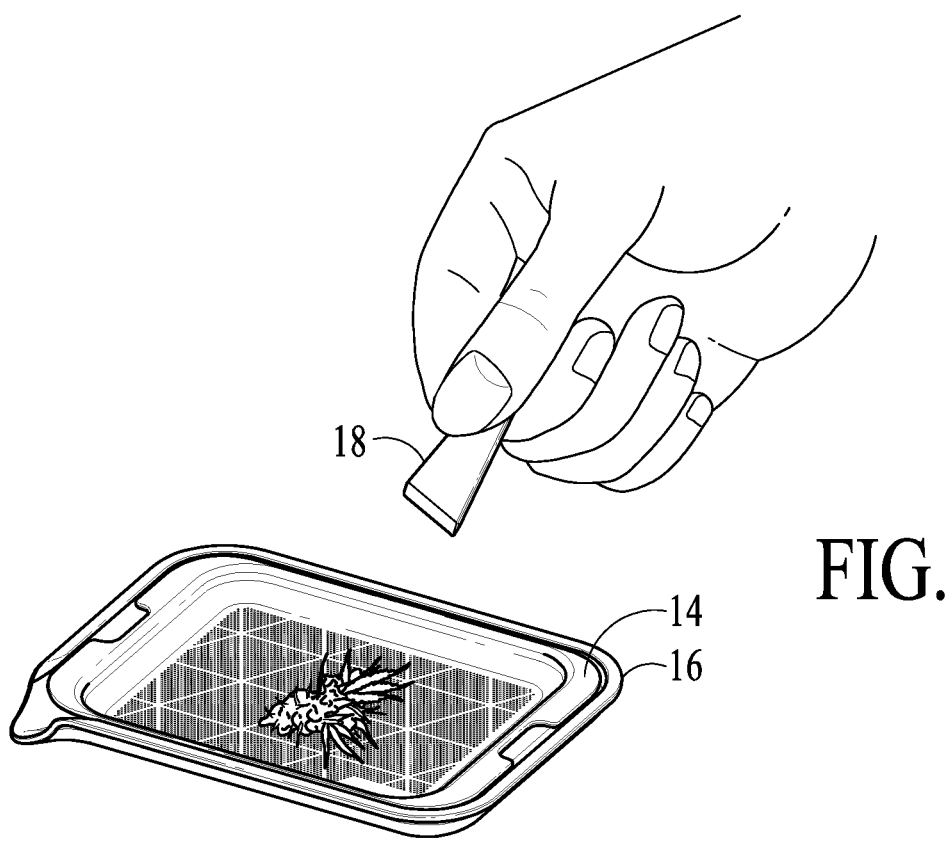
FIG. 5 illustrates the sifter being used in conjunction with the nested collection tray, the sifter holding a plant that is to be processed.
Figure 6:
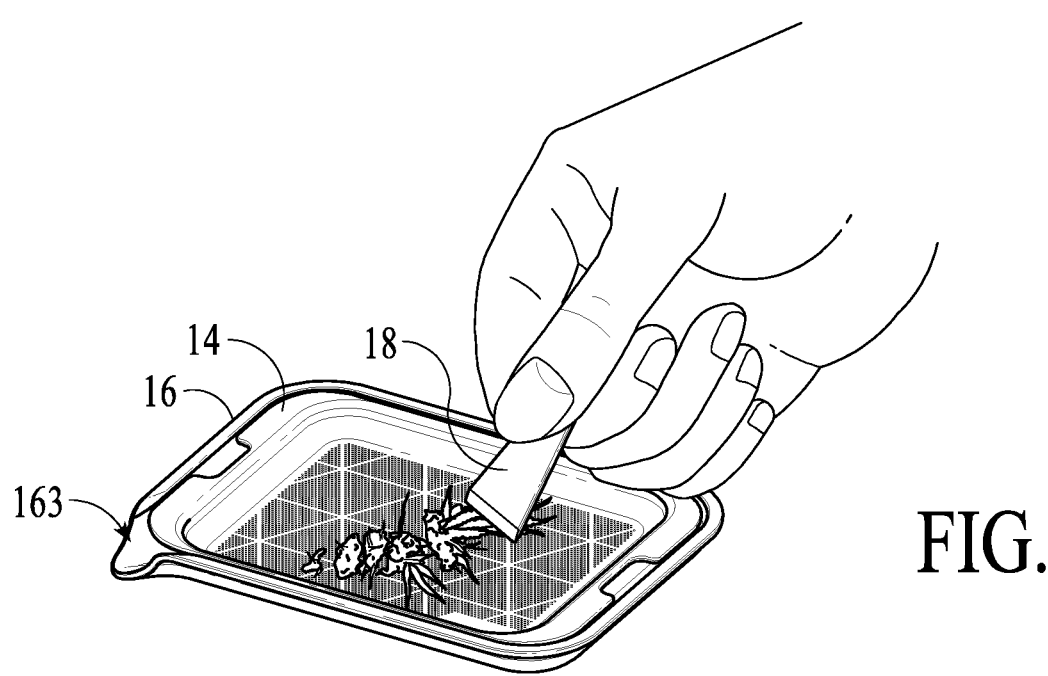
FIG. 6 shows a user chopping the plant.
Figure 7:
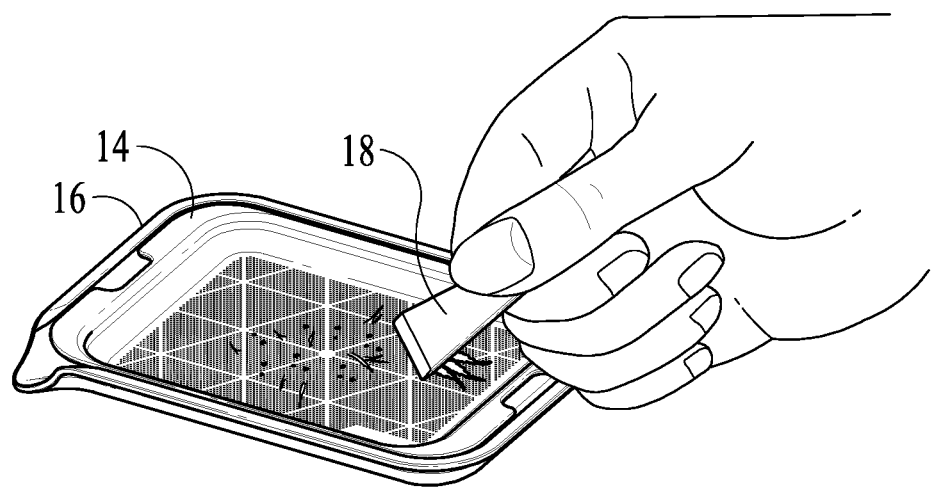
FIG. 7 illustrates the user scraping the chopped plant across the sifter to force the plant through the sifter into the collection tray.

FIGS. 5-8 further illustrate the function of the combination device 10. FIG. 5 shows bulk plant material placed in the feed-in area 141 of the sifter 14. The user sections the plant with the scraper/chopper 18 until the pieces are workable. FIG. 6 shows the user working the plant with the scraper/chopper 18 until the plant is ground to the desired fineness. As shown in FIG. 7, the plant is ground with the scraper/chopper 18 until the plant has been processed so that the pieces of the plant are small enough to fit through the pass-through holes 142 in the sifter 14. The resultant product, mostly fines, is collected in the collection area 162 of the collection tray 16. When the user is ready to use the product, the user pours the processed material out of the pour spout 163.

Referring again to FIG. 3, the device 10 is configured as a unitary device so that the user can easily transport it. The sifter 14 fits into the collection tray 16. The table 12 is then placed on top of the sifter 14 and the collection tray 16, and the side flaps 122 affix the table 12 to the collection tray 16. The locking projections 123 on the side flaps 122 are press fit around the lip 161 of the collection tray 16 to lock the elements of the combination device 10 in place. In this configuration, the table 12 can be readily accessed by the user.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

In the foregoing description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A plant processing device comprising a combination of a table, sifter, and collection tray device, comprising:
   the table comprising an unobstructed planar surface and including an integral sealing projection, the table including a pair of side flaps, each of the side flaps including at least one projection that mates with a lip on a collection tray to secure the table to a collection tray, and a clip holder configured to secure a scraper/chopper tool on an underside of the table;
   the sifter; and
   the collection tray having a bottom element spaced apart from a bottom element of the sifter to provide a collection area, the collection tray including an integral pour spout that mates with the sealing projection on the table, the pour spout being covered by the sealing projection, to prevent product from spilling out of the pour spout during transit of the device, the pour spout enabling a user to easily pour product out of the collection tray; wherein:
   the sifter nests into the collection tray, and the table is releasably attached to the collection tray so that the device forms a single unit for easy transport, the table being configured to operate separately from the sifter and the collection tray.

2. The device of claim 1, wherein:
the scraper/chopper tool is included with the device.

3. The device of claim 1, wherein:
at least one component of the device is formed from hemp.

4. The device of claim 1, wherein:
the sifter includes a feed-in area to accept working material, the feed-in area having a plurality of pass-through holes therein.

5. The device of claim 1, wherein:
the pour spout is integral to the collection tray.

6. The device of claim 1, wherein:
the sealing projection is integral to the table.

* * * * *